Inventor:
Clyde F. Czernek
By John W Butcher Atty

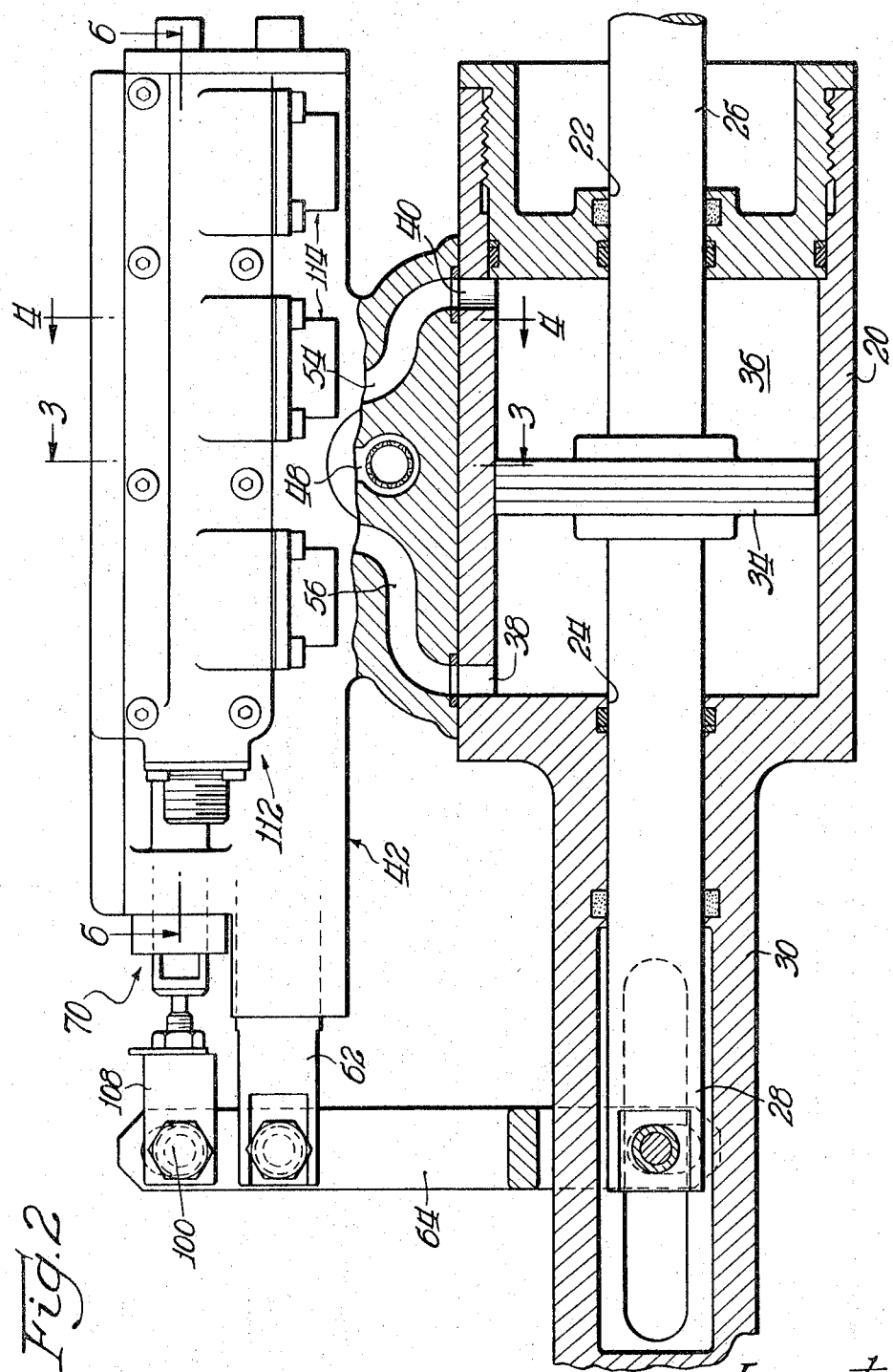

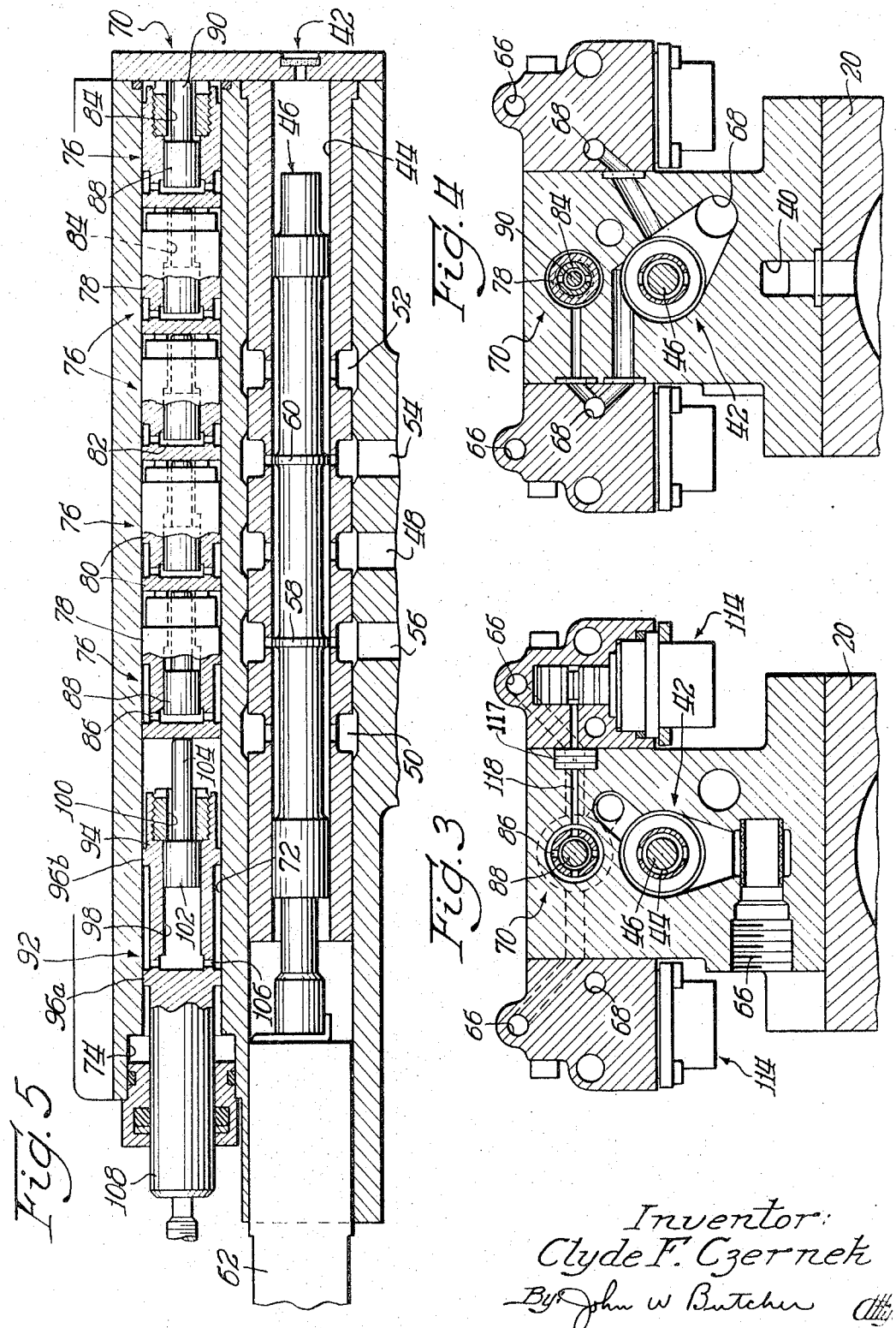

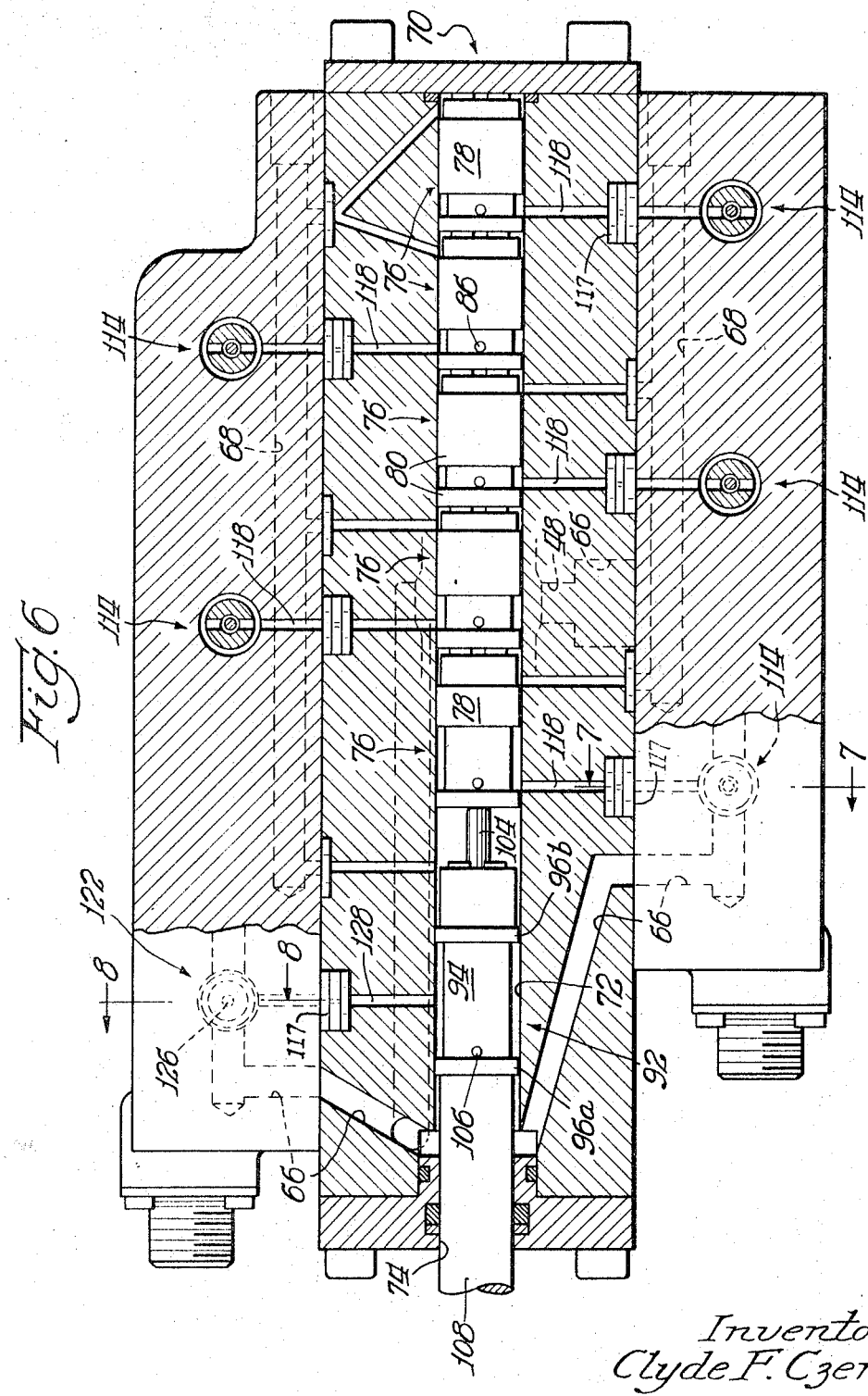

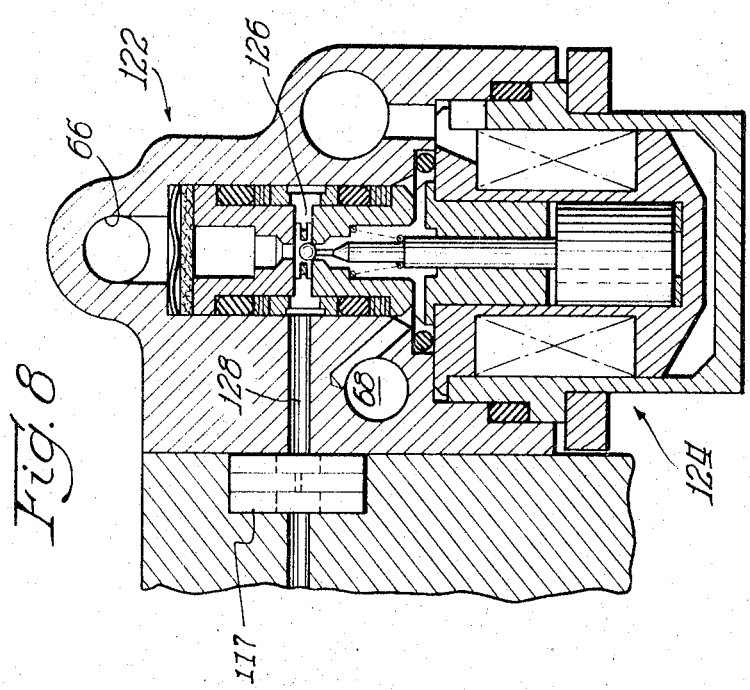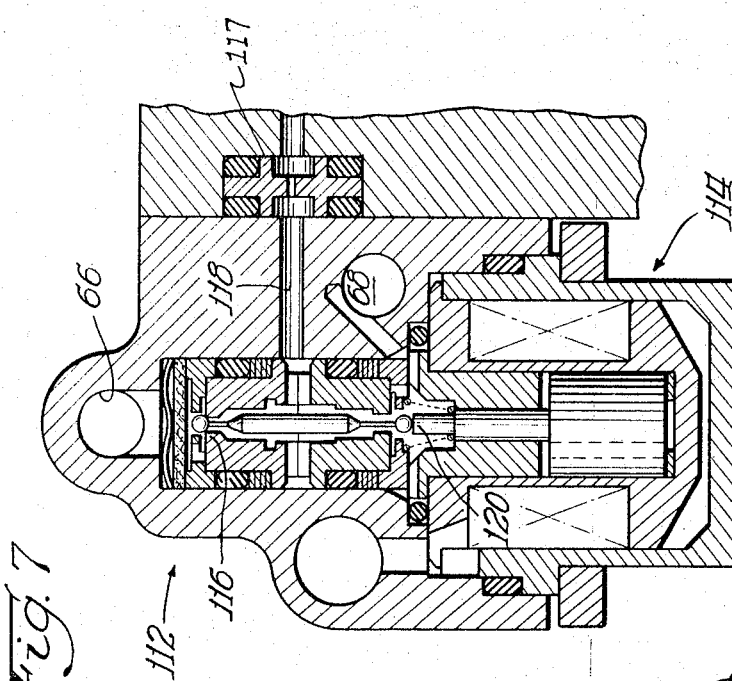

United States Patent Office 3,307,584
Patented Mar. 7, 1967

3,307,584
CONTROL SYSTEM
Clyde F. Czernek, Sepulveda, Calif., assignor to Weston Hydraulics, Limited, Van Nuys, Calif., a corporation of California
Original application Aug. 5, 1963, Ser. No. 299,969, now Patent No. 3,229,588, dated Jan. 18, 1966. Divided and this application Oct. 22, 1965, Ser. No. 525,780
6 Claims. (Cl. 137—625.64)

The present application is a division of application Serial No. 299,969, filed August 5, 1963, now Patent No. 3,229,558 granted January 18, 1966, entitled Control System.

This invention relates to a control system for an actuator and more particularly to a servo control system.

Briefly described, the invention includes a novel hydraulic digital converter which in turn includes a plurality of cylinder-piston adders arranged in series. Each cylinder-piston adder is actuated independent the adjacent cylinder-piston adders. The first adder in the series reacts against a fixed reference point and as a given piston extends or retracts within its cylinder, the length of the series of adders changes a corresponding amount. The total movement of the adder assembly is thus determined by the combined cumulative displacements of the pistons with respect to their respective cylinders. A novel combination of cylinder-piston displacements plus a unique mode of actuating the individual adders makes the hydraulic digital converter especially suitable for use in a servo system. The servo system may include a feedback linkage from the actuator to the hydraulic digital converter.

A more complete understanding of the invention will be readily apparent to those skilled in the art from the specification and appended drawing illustrating a certain preferred embodiment in which:

FIGURE 2 is a view, partially in cross section, illustrating the actuator and its associated relationship with the servo system;

FIGURE 3 is a view, partially in cross section, taken generally along lines 3—3 of FIGURE 2;

FIGURE 4 is a view, partially in cross section, taken generally along lines 4—4 of FIGURE 2;

FIGURE 5 is a partial view, partially in cross section, of the digital converter component and the control valve component of the servo system;

FIGURE 6 is a view, partially in cross section, illustrating the hydraulic digital converter component of the servo system;

FIGURE 7 is a view, partially in cross section, taken generally along lines 7—7 of FIGURE 6;

FIGURE 8 is a view, partially in cross section, taken generally along lines 8—8 of FIGURE 6.

Figure 1:
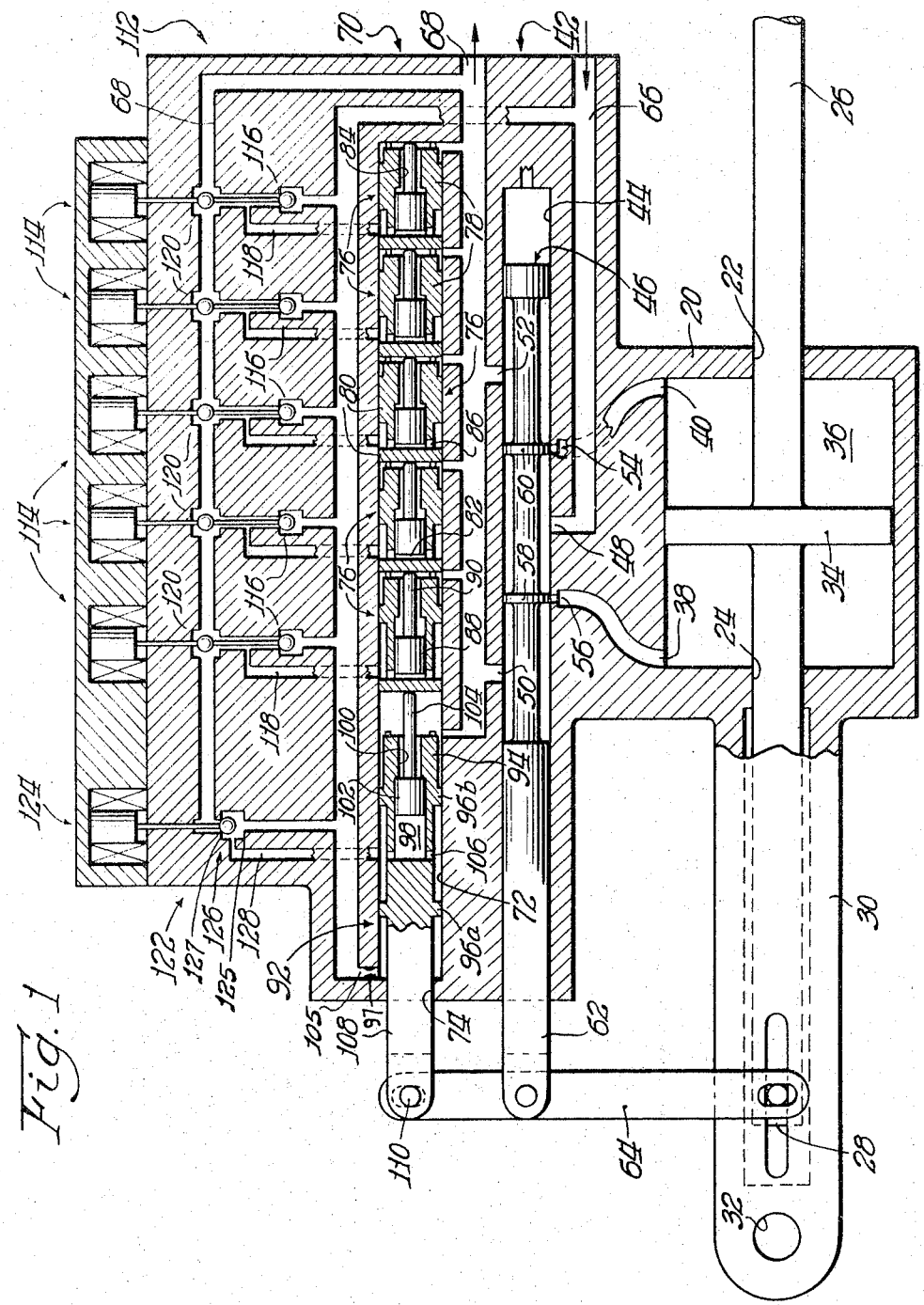
FIGURE 1 is a schematic representation of one embodiment of the servo control system.

Referring now to the drawing and more particularly FIGURE 1, the actuator housing 20 is provided with opposed openings 22 and 24. An actuator piston rod 26 extends through the openings 22 and 24. The piston rod 26 includes a first end 28 reciprocally received within a ground member 30 of the actuator housing. The ground member 30 is adapted to be pivotally connected to ground by way of pivot hole 32. The actuator piston rod 26 carries an actuator piston 34 which is located within the chamber 36 of housing 20. Ports 38 and 40 communicate with chamber 36 on opposite sides of the actuator piston 34.

A flow control valve 42 is provided to direct fluid under pressure from a source of fluid under pressure to chamber 36 and to direct fluid from chamber 36 to a return line. The flow control valve 42 includes a bore 44, spool 46 and ports 48, 50, 52, 54 and 56. The spool includes lands 58 and 60 as well as feedback end 62 which is connected to feedback link 64. An inlet passage 66 is connected to a source of fluid under pressure and is arranged to supply fluid under pressure to port 48 which port is located intermediate lands 58–60 in bore 44. An outlet passage 68 is adapted to communicate ports 50–52 with a fluid return line. Port 50 is positioned in the bore 44 between land 58 and the left end of the bore 44 and port 52 is positioned in the bore 44 between land 60 and the right end of bore 44.

The digital converter 70 includes an elongated bore 72 having an opening 74 at one end thereof. A plurality of adders 76 is provided within the bore 72. Each of the adders 76 includes a cylinder 78 slidably positioned within the bore 72. Each cylinder 78 is provided with spaced apart lands 80 which provide sealing contact between their respective cylinders and the bore 72. Each of the cylinders is provided with a chamber 82 and an opening 84 extending from the chamber 82 to the exterior of the cylinder 78. The cylinders include a port 86 which is located intermediate the spaced apart lands 80. The port provides communication between the bore 72 and the chamber 82. An adder piston 88 is provided within each chamber 82. Each of the adder pistons includes an adder piston rod 90 which extends through passage 84 into the bore 72.

The adders 76 are preferably arranged in series in a manner such that energization of an adder with the resultant movement of the individual piston with respect to its associated cylinder (its stroke) results in the elongation of the total series of adders by an amount equal to the stroke of the cylinder-piston adder. In other words, a movement of an individual piston through its stroke (a predetermined distance) with respect to its cylinder results in the same displacement of the respective ends of the cylinders of the total adder series.

A biasing means 92 is provided at one end of the bore 72. The biasing means includes a biasing cylinder 94 having spaced apart lands 96a and 96b on the exterior surface thereof which lands form a seal with the bore 72. The biasing cylinder 94 includes an internal chamber 98 and an opening 100 extending into the bore 72. A piston 102 is reciprocably mounted within the internal chamber 98. The piston includes a piston rod 104 extending through the opening 100 into the bore 72. A port 106 is provided through the wall of the biasing cylinder 94 between the spaced apart lands 96a and 96b. The primary function of the biasing means 92 is to collapse the series of adders (cause the pistons to retract within their cylinders) in the absence of fluid under pressure being supplied to the individual adders. System pressure is fed to bore 72 by way of port 105 and acts against land 96a to force biasing cylinder 94 to the right. The force exerted by system pressure in an individual adder is sufficient to overcome the force exerted by system pressure acting on land 96a. A restrictor 97 is located in port 105. The purpose of the restrictor is to control the reaction speed of the complete set of adders. This is necessary to minimize the retrograde, or reversal in stroke, which can occur due to differences in actuation time of the individual adder. The biasing cylinder 94 includes an end portion 108 which extends through the opening 74. The end portion 108 is adapted to be connected to the feedback link 64 by way of pin 110. The disclosed biasing means is of the hydraulic type; however, it will be readily apparent to those skilled in the art that other biasing means may be substituted as a means of collapsing the adders. Likewise, the connection between the digital converter and the feedback link has been illustrated as connected to the biasing means. Substantially similar results may be achieved by connecting the feedback link directly to the adder series.

where P=number of positions and $n$=number of cylinder-piston adders. A typical program utilizing the embodiment illustrated in FIGURE 1 is given in the following table:

TABLE I.—SERVO SYSTEM CODE

| Position No. | Actuator Position | Solenoid Nos. | | | | | | Position No. | Actuator Position | Solenoid Nos. | | | | | |
|---|---|---|---|---|---|---|---|---|---|---|---|---|---|---|---|
| | | 1 | 2 | 3 | 4 | 5 | 6 | | | 1 | 2 | 3 | 4 | 5 | 6 |
| 1 | .761 | | | | | | X | 33 | 2.000 | | | | | | |
| 2 | .799 | X | | | | | X | 34 | 2.039 | X | | | | | |
| 3 | .838 | | X | | | | X | 35 | 2.078 | | X | | | | |
| 4 | .877 | X | X | | | | X | 36 | 2.116 | X | X | | | | |
| 5 | .916 | | | X | | | X | 37 | 2.155 | | | X | | | |
| 6 | .954 | X | | X | | | X | 38 | 2.194 | X | | X | | | |
| 7 | .993 | | X | X | | | X | 39 | 2.232 | | X | X | | | |
| 8 | 1.032 | X | X | X | | | X | 40 | 2.271 | X | X | X | | | |
| 9 | 1.070 | | | | X | | X | 41 | 2.310 | | | | X | | |
| 10 | 1.109 | X | | | X | | X | 42 | 2.349 | X | | | X | | |
| 11 | 1.148 | | X | | X | | X | 43 | 2.387 | | X | | X | | |
| 12 | 1.187 | X | X | | X | | X | 44 | 2.426 | X | X | | X | | |
| 13 | 1.225 | | | X | X | | X | 45 | 2.465 | | | X | X | | |
| 14 | 1.264 | X | | X | X | | X | 46 | 2.504 | X | | X | X | | |
| 15 | 1.303 | | X | X | X | | X | 47 | 2.542 | | X | X | X | | |
| 16 | 1.342 | X | X | X | X | | X | 48 | 2.581 | X | X | X | X | | |
| 17 | 1.380 | | | | | X | X | 49 | 2.620 | | | | | X | |
| 18 | 1.419 | X | | | | X | X | 50 | 2.697 | X | | | | X | |
| 19 | 1.458 | | X | | | X | X | 51 | 2.736 | | X | | | X | |
| 20 | 1.497 | X | X | | | X | X | 52 | 2.774 | X | X | | | X | |
| 21 | 1.535 | | | X | | X | X | 53 | 2.813 | | | X | | X | |
| 22 | 1.574 | X | | X | | X | X | 54 | 2.852 | X | | X | | X | |
| 23 | 1.613 | | X | X | | X | X | 55 | 2.891 | | X | X | | X | |
| 24 | 1.651 | X | X | X | | X | X | 56 | 2.930 | X | X | X | | X | |
| 25 | 1.690 | | | | X | X | X | 57 | 2.930 | | | | X | X | |
| 26 | 1.729 | X | | | X | X | X | 58 | 2.968 | X | | | X | X | |
| 27 | 1.768 | | X | | X | X | X | 59 | 3.007 | | X | | X | X | |
| 28 | 1.806 | X | X | | X | X | X | 60 | 3.046 | X | X | | X | X | |
| 29 | 1.845 | | | X | X | X | X | 61 | 3.084 | | | X | X | X | |
| 30 | 1.884 | X | | X | X | X | X | 62 | 3.123 | X | | X | X | X | |
| 31 | 1.923 | | X | X | X | X | X | 63 | 3.162 | | X | X | X | X | |
| 32 | 1.961 | X | X | X | X | X | X | 64 | 3.201 | X | X | X | X | X | |

X denotes solenoid-adder as actuated.

An important characteristic of the individual adder is the fact that it has two operating positions; one of which is with the piston fully retracted, and the other of which is with the piston fully extended. Another important characteristic of this arrangement of adders is that the stroke of the series of adders is equal to the sum of the stroke of the individual adders.

Individual independent input signal means 112 is provided to admit fluid from the pressure source to each of the adders. The input signal means disclosed in FIGURE 1 includes a plurality of solenoids 114 which admit fluid from the inlet passage 66 through valves 116 and passages 118 to the bore 72 intermediate the lands 80 of the cylinders 78 of the individual adder assemblies. These solenoids 114 further provide for the release of fluid from the chambers 82 by way of passages 118, and valves 120 to exhaust pressure by way of outlet passages 68.

A polarity adder 122 includes a solenoid 124 and valve 126 with seats 125 and 127. Valve 126 is adapted to assume two positions; the first of which admits fluid from the supply source by way of the passage 66 and passage 128 to bore 72 intermediate lands 96 on the biasing cylinder 94 and port 106 into the internal chamber 98 of the biasing cylinder 94, and the second of which admits fluid from the internal chamber 98, port 106 and passage 128 into outlet passage 68.

A particularly important feature of the present invention is the stroke of each individual adder with respect to the stroke of the other adders. A preferred arrangement is with the stroke of the first adder in the series of a predetermined length and each additional adder in the series with a stroke equal to two times the stroke of the preceding adder. These strokes can be set for any value compatable with the code being used. The number of cylinder-piston adders used in the series determines the maximum number of positions which can be selected. With the preferred relationship of relative strokes set forth hereinabove, the maximum number of control positions is governed by the formula:

$$P = 2^n$$

Figure 9:
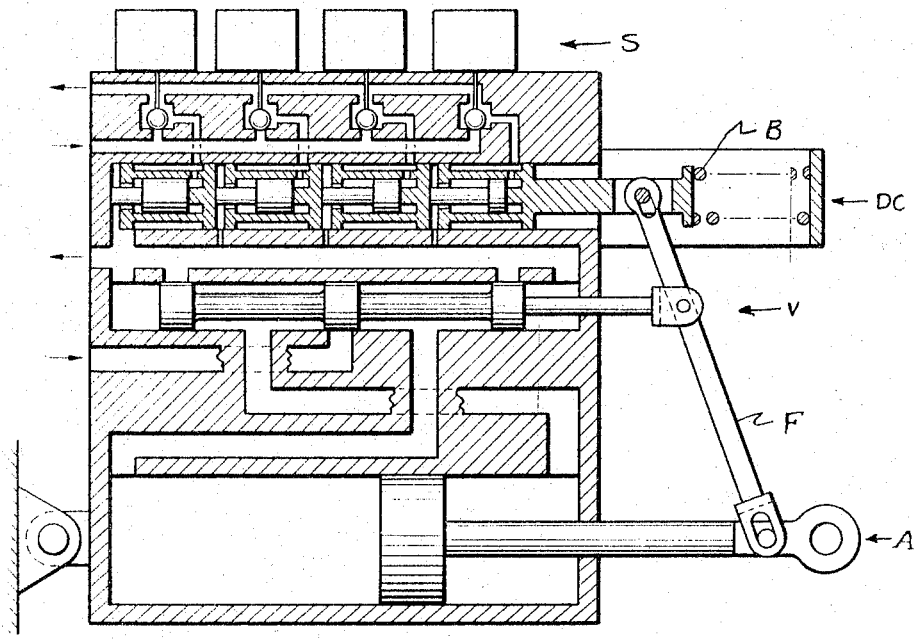
FIGURE 9 is a schematic representation of an alternate embodiment of the servo control system.

FIGURE 9 illustrates an alternate embodiment of a control system utilizing an actautor A, a four-way valve V, a digital converter D.C., a feedback linkage F, input signal means S and a resilient biasing means B. This embodiment utilizes a resilient biasing means to collapse the individual adders upon de-energization of their respective solenoids. This biasing means is used in lieu of the hydraulic biasing means disclosed in FIGURE 1. This alternate embodiment also differs from the FIGURE 1 embodiment in that the feedback link is connected to the adder assembly.

Referring to FIGURE 1 and the operation of the system, fluid under pressure is supplied by way of inlet passage 66 to port 48, valve 116, valve 126, and port 105. Assuming valves 116 are closed and valve 126 is seated on seat 127, fluid under pressure from inlet passage 66 is fed to bore 72 by way of port 105 and this fluid acts against land 96a to shift the biasing cylinder 94 to the right, thus collapsing the individual adder assemblies. Energization of an individual solenoid 114 causes valve 116 to open and valve 120 to close. This admits fluid from inlet passage 66 to passage 118, and bore 72 intermediate lands 80. This fluid passes through port 86 into the adder chamber 82, thus causing the adder piston 88 and the adder cylinder 78 to shift with respect to each other such that the adder piston rod 90 is fully extended. As each additional solenoid is energized, its respective valve members 116 and 120 operate as described hereinabove and its associated cylinder-piston adder assembly is activated to extend the adder piston rod 90 from the end of its cyplinder an amount equal to the stroke of the cylinder-piston adder. As each adder is activated, the overall length of the series of adders is increased an amount equal to the stroke of the individual energized adders. Any one, none, all of, or any combination of the adders may be actuated at a specific time.

As a means of controlling the actuation time of the individual adder assemblies, each solenoid output channel 118 is equipped with a throttling restrictor 117. As can readily be ascertained, the adders with small displacements will complete their travel in a shorter period of time than that required for the longer stroke adders if each were subjected to the same pressure and flow conditions. The subject restrictors 117 are uniquely sized in such a way that the resulting restrictors impose limitations on the pressure and flow being supplied by the solenoid valves 114 and 124 and hence equalize the actuation time of each of the individual adder assemblies.

An increase in length of the series of adders results in movement of end portion 108 to the left. This causes feedback link 64 to shift to the left thus changing the position of the four-way valve spool 46. Land 58 moves from a position blocking flow through port 56 thus allowing fluid under pressure in bore 44 to pass through port 56, port 38 and into chamber 36 thus shifting the actuator piston 34 to the right. Land 60 of spool 46 moves from a position blocking port 54 thus permitting flow of fluid from chamber 36 through port 40 and bore 44 through port 52 into outlet passage 68. As the actuator piston 34 moves to the right, feedback link 64 carries the feedback end 62 of the valve spool to the right thus re-positioning lands 58 and 60 in a position blocking ports 56 and 54, respectively.

The above procedure of operation is substantially reversed upon de-energization of the solenoid. For example, de-energization of the solenoid causes valve 116 to close and valve 120 to open. This vents the fluid in chamber 82 through port 86, passage 118 and valve 120 to outlet passage 68. Fluid under pressure from inlet passage 66 is fed to bore 72 by way of port 105 and this fluid acts against land 96a of biasing cylinder 94 thus shifting the biasing cylinder to the right. The biasing cylinder causes the deflating adder to collapse. This shortens the overall length of the adder series and shifts the end portion 108 of the digital converter to the right. Movement of the end portion 108 causes the feedback link 64 to shift the feedback end 62 of the spool 46 to the right. Land 60 is moved from a position blocking flow through port 54 thus permitting fluid to flow from port 48 through port 54 and port 40 into the actuator chamber 36 thus shifting the actuator piston to the left. At the same time, land 58 of spool 46 is moved from a position blocking flow through port 56 thus permitting fluid to flow from chamber 36 through ports 38, 56 and 50 into outlet passage 68 to exhaust pressure.

Movement of the actuator piston to the left carries feedback link 64 to the left re-positioning feedback end 62 of the valve spool 46 such that lands 60 and 58 block the flow of fluid through ports 54 and 56 respectively.

The polarity adder which consists of biasing cylinder 94, piston 102 and its associated valve 126 provides for extreme simplification of the digital program code for the servo system. The stroke of piston 102 with respect to the biasing cylinder 94 is preferably at least equal to the cumulative stroke of all the other cylinder-piston adder units. With the provision of the polarity adder, it is possible to de-energize all the cylinder-piston adder solenoids as well as the polarity adder solenoid and obtain a null position of the piston actuator 34 at a substantially central location within the actuator housing. Thus, with the polarity adder solenoid 124 de-energized, it is possible to obtain 32 separate positions of the piston actuator on one side of null and with the polarity adder solenoid energized it is possible to obtain 32 separate positions of the piston actuator on the other side of null. This particular digital code program, utilizing the combination of cylinder-piston actuators and solenoids as disclosed in FIGURE 1, is preferable in that a loss of electrical power to the system results in positioning the actuator piston at null rather than hard right or hard left.

The servo system disclosed herein is capable of precise positioning and is suitable for use in aircraft and missile flight control surface actuation, missile nozzle gimbaling actuation, machine tool controls, and other control systems wherein digital incremental control is desired.

Manifestly, the construction as shown and described is capable of some additional modification and such modification as may be construed to fall within the scope and meaning of the appended claims is also considered to be within the spirit and intent of the invention.

I claim:

1. A servo valve suitable for operating an actuator comprising a housing having a bore formed therein, a plurality of cylinders arranged in end-to-end relationship slidably positioned within said bore forming a series of cylinders, a piston reciprocally mounted within each said cylinder, a piston rod associated with each piston extending from said cylinder, an inlet passage within said housing adapted to receive fluid under pressure, means connecting said inlet passage to said first bore to provide a bias against said series, means connecting said inlet passage to said first bore to provide for admission of fluid within each said cylinder to cause reciprocation of said piston with respect to said cylinder, a flow control valve suitable to direct fluid to and away from said actuator, means connecting said inlet passage with said flow control valve, means driven by said series of cylinders to actuate said flow control valve, and an outlet passage interconnected with said flow control valve and said first bore.

2. A servo valve comprising a housing having a first bore and a second bore therein, a series of adders each including a cylinder with a piston mounted therein reciprocally positioned within said first bore, means to bias said series in a manner to shorten the length of said series, inlet passage means to supply fluid under pressure to each said adder such that said piston and said cylinder are caused to move with respect to each other to increase the length of said adder and said series, means to control the rate of operation of each of said adders, a flow control valve positioned within said second bore, means providing communication between said inlet passage means and said flow control valve, means responsive to the length of said series to shift said flow control valve and outlet passage means in communication with said flow control valve and to each said adder.

3. A servo valve comprising a housing having a first bore and a second bore therein, a series of adders each including a cylinder with a piston mounted concentrically and reciprocally therein, said adders being reciprocally positioned within said first bore, means to bias said series in a manner to shorten the length of said series, means to control the rate of operation of said series of adders, fluid inlet passage means effective to supply fluid under pressure to each said adder such that said piston and said cylinder are caused to move with respect to each other to increase the length of said adder and said series, means to control the rate of operation of each of said adders, a flow control valve positioned within said second bore, means connecting said fluid inlet passage with said flow control valve, means responsive to the length of said series to move said flow control valve and fluid outlet passage means connected with each said adder and said flow control valve.

4. A servo valve comprising a housing having a first bore and a second bore therein, a series of adders each including a cylinder with a piston mounted therein reciprocally positioned within said first bore, means responsive to fluid under pressure to bias said series in a manner to shorten the length of said series, means to control the rate of operation of said series of adders, fluid inlet passage means effective to supply fluid under pressure to each said adder such that said piston and said cylinder are caused to move with respect to each other to increase the length of said adder and said series, means to control the rate of operation of each of said adders, a flow control valve positioned within said second bore, means connecting said fluid inlet passage with said flow control valve, means responsive to the length of said series to shift said flow control valve and fluid outlet passage means connected with each said adder and with said flow control valve.

5. A servo valve comprising a housing having a first bore and a second bore therein, a series of adders each including a cylinder with a piston mounted therein reciprocally positioned within said first bore, resilient means to bias said series in a manner to shorten the length of said series, fluid inlet passage means effective to supply fluid under pressure to each said adder such that said piston and said cylinder are caused to move with respect to each other to increase the length of said adder and said series, a flow control valve positioned within said second bore, means interconnecting said fluid inlet passage with said second bore, means responsive to the length of said series to shift said flow control valve and fluid outlet means in communication with said first bore and said second bore.

6. A servo valve comprising a housing having a first bore and a second bore therein, a series of adders each including a cylinder with a piston mounted therein reciprocally positioned within said first bore, means to bias said series in a manner to shorten the length of said series, means to control the speed of operation of the complete set of adders, means to supply fluid under pressure to each said adder such that said piston and said cylinder are caused to move with respect to each other to increase the length of said adder and said series, means to control the rate of operation of each of said adders, a flow control valve positioned within said second bore, means to supply fluid under pressure to said flow control valve means responsive to the length of said series to shift said flow control valve and fluid outlet passage means in communication with said first bore and said second bore.

References Cited by the Examiner

UNITED STATES PATENTS

| | | | |
|---|---|---|---|
| 465,477 | 12/1891 | Johnson | 251—58 XR |
| 2,931,340 | 4/1960 | White | 91—167 |
| 3,000,363 | 9/1961 | Hayner et al. | 137—625.64 |
| 3,130,549 | 4/1964 | Freeman | 91—167 XR |
| 3,141,388 | 7/1964 | Brandstadter | 91—167 XR |
| 3,216,454 | 11/1965 | Richter et al. | 137—625.69 |

FOREIGN PATENTS 483,835    4/1938    Great Britain.

M. CARY NELSON, *Primary Examiner.*

HENRY T. KLINKSIEK, *Examiner.*